United States Patent [19]

McMurtry et al.

[11] Patent Number: 4,926,566
[45] Date of Patent: May 22, 1990

[54] METHOD OF PRODUCING A METROLOGICAL SCALE AND SCALE PRODUCED BY SUCH METHOD

[75] Inventors: D. R. McMurtry, Wotton-under-Edge; W. F. N. Stephens, Badminton; M. Kirkbride, Dursley, all of United Kingdom

[73] Assignee: Renishaw PLC, Gloucestershire, United Kingdom

[21] Appl. No.: 368,152

[22] Filed: Jun. 15, 1989

Related U.S. Application Data

[63] Continuation of Ser. No. 165,989, filed as PCT GB87/00472 on Jul. 3, 1987, published as WO 88/00331 on Jan 14, 1988, abandoned.

[30] Foreign Application Priority Data

Jul. 3, 1986 [GB] United Kingdom ............... 8616240

[51] Int. Cl.⁵ .............................................. G01B 3/10
[52] U.S. Cl. ........................................ 33/771; 33/706; 33/494; 33/493
[58] Field of Search ............... 33/493, 494, 19.1, 19.2, 33/19.3, 755, 771, 706; 72/47, 197, 700; 76/101 R

[56] References Cited

U.S. PATENT DOCUMENTS

| | | | |
|---|---|---|---|
| 41,742 | 2/1864 | Jones | 33/19.2 |
| 1,249,132 | 12/1917 | Leavens | 33/493 |
| 2,171,504 | 8/1939 | Keyffel et al. | 33/137 R |
| 3,409,988 | 11/1968 | Zelnick | 33/137 R |
| 3,996,780 | 12/1976 | Germon | 72/197 X |
| 4,338,807 | 7/1982 | Ricono et al. | 72/197 X |
| 4,477,726 | 10/1984 | Reichl | |
| 4,530,230 | 7/1985 | Monks | |
| 4,598,564 | 7/1986 | Held | 72/197 X |

FOREIGN PATENT DOCUMENTS

| | | |
|---|---|---|
| 826365 | 1/1952 | Fed. Rep. of Germany ....... 33/19.2 |
| 1448511 | 4/1969 | Fed. Rep. of Germany ....... 3.3/494 |
| 2405341 | 8/1975 | Fed. Rep. of Germany . |
| 75004 | 5/1983 | Japan . |
| 122103 | 7/1983 | Japan . |

Primary Examiner—Harry N. Haroian
Attorney, Agent, or Firm—Spencer & Frank

[57] ABSTRACT

A metrological scale for use in optoelectronic scale reading apparatus comprising a tape made of spring steel and having a surface layer of copper. The scale has scale marks constituted by a zig-zag or other profile impressed into the surface layer by a rolling process. During rolling, the relatively soft copper is readily deformed to accept the profile while the spring steel resists plastic elongation of the tape.

16 Claims, 2 Drawing Sheets

METHOD OF PRODUCING A METROLOGICAL SCALE AND SCALE PRODUCED BY SUCH METHOD

This application is a continuation, of application Ser. No. 07/165,989, filed as PCT GB87/00472 on Jul. 3, 1987, published as WO88/00331 on Jan. 14, 1988 now abandoned.

BACKGROUND AND SUMMARY OF INVENTION

This invention relates to metrological scales e.g. scales for use in opto-electronic scale-reading apparatus. Such scales are known to comprise an elongate metallic scale member having alternate marks and spaces provided at a longitudinal surface thereof. It is known to provide the marks by lithographic methods but such methods are not readily suitable for making the scale in substantial lengths or in continuous lengths. It is also known for the scale member to be a flexible tape and the known lithographic methods are not readily suitable for producing the scale in a continuous way, possibly for reels of such tape. It is an object of this invention to overcome or reduce at least some of those difficulties. The invention may be considered in three aspects, viz. a method, a blank scale and finished scale.

BRIEF DESCRIPTION OF THE DRAWINGS

An example of the different aspects of this invention will now be described with reference to the accompanying drawings wherein.

DESCRIPTION OF THE PREFERRED EMBODIMENTS

Figure 1:
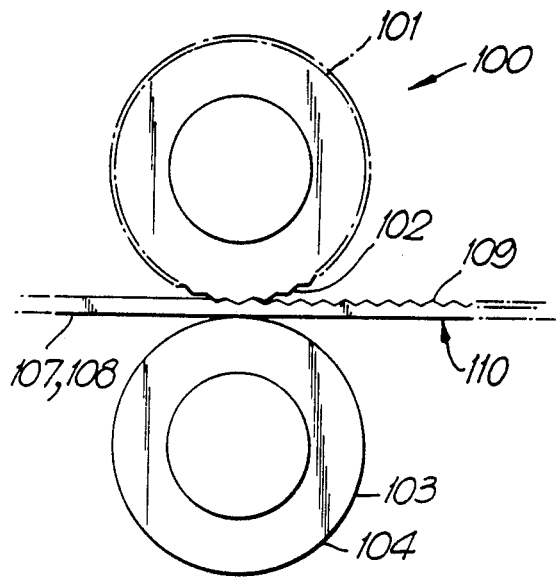
FIG. 1 is a diagrammatic illustration of a rolling apparatus and a scale being rolled.
Figure 2:
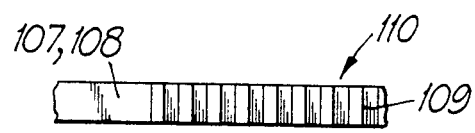
FIG. 2 is a plan view of the scale shown in FIG. 1.
Figure 3:
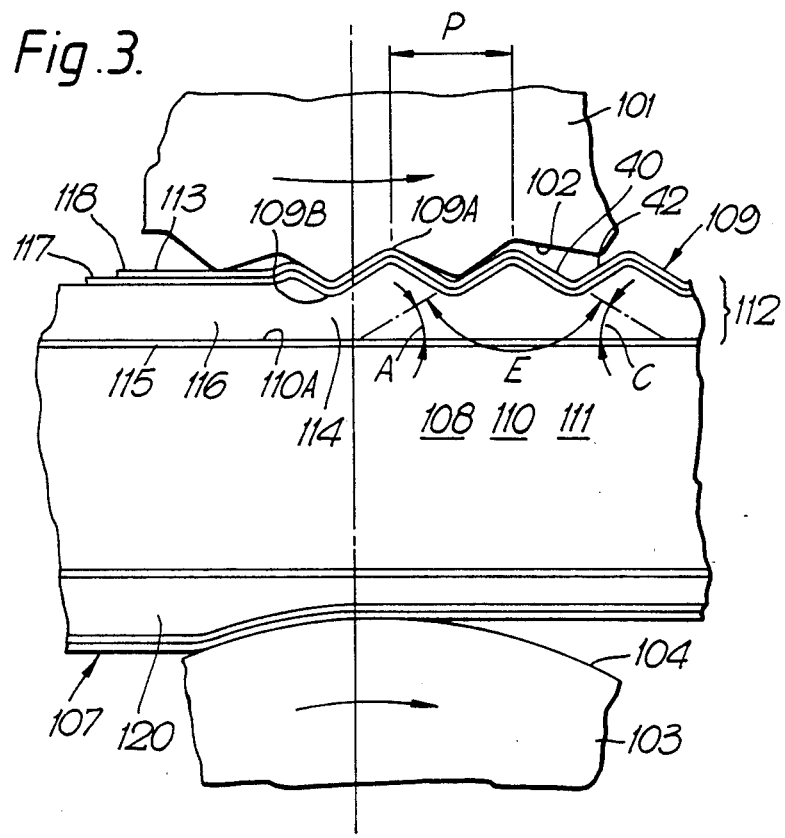
FIG. 3 is an enlarged detail of FIG. 1 and shows a first example of the profile of the scale.

The rolling apparatus, denoted 100 (FIG. 1), comprises an upper or forme roller 101, and a lower or impression roller 103. Means, not shown and understood per se, are provided for driving the rollers 101, 103 and adjusting the pressure between them. A scale 110 is required to have a scale profile 109 defined by alternate first and second surfaces 40, 42 (FIG. 3) positioned to define angles A,C relative to a reference plane 110A, an angle E being defined between the surfaces 40, 42. The scale profile 109 is a periodic structure having a pitch P which may be of the order of 0.020 mm. The forme roller 101 has a roller profile 102 which is the counterpart of the scale profile 109. In operation, a blank 107 of the scale 110 is passed between the rollers and the profile of the forme foller is impressed into the surface of the scale. Thus the roller 101 determines the profile 109 and the pitch P. The roller profile 102 may be produced by diamond cutting a cylindrical blank with the appropriate precision.

The scale 110 is an elongate flexible member or tape 108 comprising a substrate 111 and a surface layer or profile layer 112 made of a material softer than that of which the substrate 111 is made. The relationship between roller pressure, roller profile and the relative hardnesses of the substrate 111 and the profile layer 112 are so chosen that only the profile layer is plastically deformed by the forme roller and that the substrate 111 does not undergo plastic deformation. Thereby the substrate 111 provides stability against roller pressure in the sense that the scale will not undergo significant extension in the direction of its length due to rolling. This is of particular advantage if the scale is relatively long, say 1 m or more, because the effect of said extension would be cumulative. Also, by being softer and more pliable, the profile layer 112 is better able to accept the precisely defined profile of the roller 101 without hysteresis while the tougher substrate provides the mechanical strength necessary generally to avoid damage in production and installation.

In the present example the substrate 111 is made of spring steel tape about 0.1 mm thick and 5 mm wide. The profile layer 112 is basically made of copper and has a thickness of about 0.012 mm. Thus the profile layer 112 can readily be deformed to have a said profile 109 whose highest and lowest points 109A, 109B lie within a height of 0.005 mm. The rolling pressure causes the profile 109 to extend only partly into the original surface, 113, of the layer 112 so as to leave a satisfactory thickness 114 between the lowest point 109B and the substrate 111.

In the present example, the layer 112 is a composite comprising, in succession from the substrate 111, a layer 115 of cyanide copper about 0.0002 mm thick, a layer 116 of acidic copper about 0.010 mm thick, a layer 117 of nickel about 0.0005 mm thick, and a layer 118 of gold about 0.0005 mm thick. The deformation is basically taken by the layer 116. The layer 115 is introduced to protect the steel of the substrate against diffusion by the acidic copper of the layer 116. The layer 115 may be any other metal, e.g. nickel, capable of fulfilling this function. Alternatively, the layer 115 may be left out if the layer 116 itself is made of cyanide copper. However, acidic copper may be preferred for the layer 116 because it tends to have a bright finish, at least before rolling, whereas the cyanide copper has a dull finish. The gold layer 118 may be introduced to provide reflectivity in the case of the layer 116 not being of sufficient reflectivity by itself. The nickel layer 117 forms a base for the gold layer 118 or protects the layer 116 against oxidation if the gold layer is not introduced. The layers 115 to 118 may be applied to the substrate 111 by any known method, e.g. electro-plating, electroless plating or pressure bonding.

Preferably, a composite layer 120 substantially the same as the layer 112 is also applied to the underside of the substrate 111 to avoid curving of the scale 110.

Figure 4:
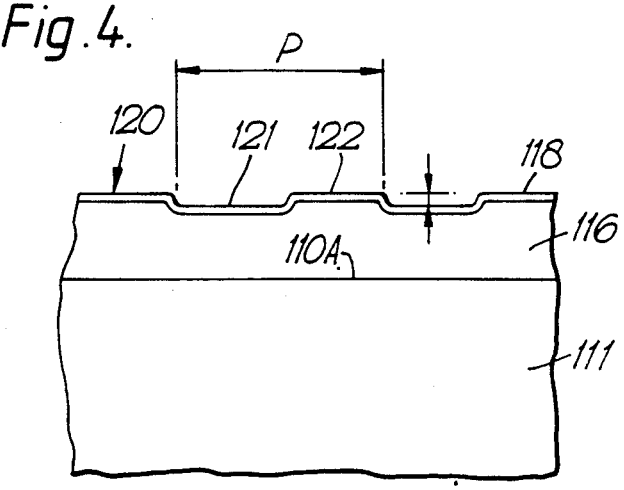
FIG. 4 shows a second example of the scale profile.

FIG. 4 shows a scale profile 120 comprising alternate first and second surfaces 121, 122 which are parallel to the reference plane 110A. The difference in height of the surfaces 121, 122 may be as low as 0.1 micron =0.0001 mm as may be required for phase gratings.

The scale surface layer 112 may have a thickness between 5 and 15% of that of the substrate 111.

It will be seen that, generally, there are two types of profile, viz. one wherein at least one of the first and second surfaces is inclined to the reference plane, and another wherein both the first and second surfaces are parallel to the reference plane. In either case the profile may be the periodic surface configuration of a diffraction grating.

It will be seen that the invention provides a scale having a surface profile wherein the first and second surfaces of the profile are defined by integral portions of the surface layer, that is neither of the first and second surfaces is defined by a deposition of a material different from that defining the other one of the surfaces.

Also, the invention provides a scale in the form of a tape having good mechanical strength provided by a substrate of resilient material, e.g. spring steel, which by itself is not amenable to have an integrally formed profile provided thereon.

We claim:

1. A method of producing a metrological scale wherein the scale comprises an elongate scale member having a reference plane and intended to have a periodic surface profile composed of alternate first and seocnd surfaces which are elongate in a direction transverse to the length of the member and which differ regarding their position relative to the reference plane, the method comprising passing the member between rollers one of which has a plain cylindrical surface and the other one of which has a surface which is generally cylindrical but which has a profile being the counterpart of the surface profile of the scale, and passing the member through the nip of the rollers while applying pressure therebetween thereby to deform one surface of the scale member in accordance with the profile of said other roller.

2. A scale member for use with the method claimed in claim 1 comprising a substrate and a profile layer applied to one side of the substrate, wherein the profile layer is made of a material which is softer than that of which the substrate is made so that, in operation, the profile layer is deformable by the counterpart profile and the substrate does not undergo significant deformation.

3. A scale member according to claim 2 wherein the substrate is made of steel.

4. A scale member according to claim 2 wherein the substrate is made of steel and the profile layer is made from one of the metals in the group consisting of copper, zinc and tin or an alloy of two or more of said metals.

5. A scale member according to claim 2 wherein a layer of reflective material is provided on the free surface of the profile layer, said reflective layer being deformable together with the profile layer.

6. A scale member according to claim 2 wherein the scale surface layer has a thickness between 5 and 15% of that of the substrate.

7. A metrological scale comprising an elongate scale member having a reference plane and a periodic surface profile having alternate first and second surfaces which are elongate in a direction transverse to the length of the scale member and which differ regarding their position relative to the reference plane, said scale member comprising a substrate supporting a surface layer of which the first and second surfaces are defined by integral portions of the surface layer, and wherein the substrate is made of a resilient material and the surface layer is made of a material which is pliant compared to that of the substrate.

8. A scale according to claim 7 wherein at least one of the first and second surfaces is inclined to the reference plane.

9. A scale according to claim 8 wherein the surface profile has a height of between 10 and 30% of the period of the surface profile.

10. A scale according to claim 7 wherein the first and second surfaces are parallel to the reference plane.

11. A method of producing a metrological scale wherein the scale comprises an elongate scale member having a reference plane and intended to have a periodic surface profile composed of alternate first and second surfaces which are elongate in a direction transverse to the length of the member and which differ regarding their position relative to the reference plane, said method comprising the steps of passing the member between rollers one of which has a surface which is generally cylindrical but which has a profile being the counterpart of the surface profile of the scale, and passing the member through the nip of the rollers while applying pressure therebetween thereby to deform a surface of the scale member in accordance with the profile of said one roller.

12. A metrological scale comprising a tape having scale marks generated thereon by plastic deformation of a surface of the tape, the tape comprising a substrate and a surface layer applied to at least one side of the tape, wherein the surface layer is made of a material which is softer than that of which the substrate is made so that, during generation of the scale marks, the surface layer is plastically deformable and the substrate does not undergo significant plastic deformation.

13. A scale according to claim 12 wherein a said surface layer is provided at each side of the tape.

14. A scale according to claim 12, wherein said scale marks are generated by pressure applied to the tape by a pair of tools when the tape is situated therebetween, the scale comprising a said surface layer at each side thereof so that, during said generation of the scale marks, plastic deformation may occur in both said surface layers.

15. A scale according to claim 2 wherein the pitch of the scale marks is of the order of 0.020 millimeter.

16. A scale according to claim 12 wherein the pitch of the scale marks is of the order of 0.020 millimeter.

* * * * *